(12) United States Patent
Su

(10) Patent No.: US 11,143,095 B2
(45) Date of Patent: Oct. 12, 2021

(54) FULL WORKING CONDITION PASSAGE-SEPARATED AND TIME-SEPARATED SUPERCHARGED INTAKE INTERNAL COMBUSTION ENGINE VARIABLE COMPRESSION RATIO TECHNOLOGY

(71) Applicant: Wei Su, Fenghuang Huayuan (CN)

(72) Inventor: Wei Su, Fenghuang Huayuan (CN)

( * ) Notice: Subject to any disclaimer, the term of this patent is extended or adjusted under 35 U.S.C. 154(b) by 0 days.

(21) Appl. No.: 16/652,816

(22) PCT Filed: Apr. 13, 2018

(86) PCT No.: PCT/CN2018/082900
§ 371 (c)(1),
(2) Date: Apr. 1, 2020

(87) PCT Pub. No.: WO2019/192026
PCT Pub. Date: Oct. 10, 2019

(65) Prior Publication Data
US 2020/0318561 A1    Oct. 8, 2020

(30) Foreign Application Priority Data
Apr. 3, 2018  (CN) .......................... 201810290314.8

(51) Int. Cl.
*F02B 33/44*  (2006.01)
*F02D 15/00*  (2006.01)
*F02D 15/04*  (2006.01)
*F02D 41/00*  (2006.01)

(52) U.S. Cl.
CPC ............. *F02B 33/44* (2013.01); *F02D 15/00* (2013.01); *F02D 15/04* (2013.01); *F02D 41/0007* (2013.01); *F02D 2041/001* (2013.01); *F02D 2200/0406* (2013.01); *F02D 2200/101* (2013.01)

(58) Field of Classification Search
CPC .......... F02B 33/44; F02B 39/10; F02B 21/00; F02B 25/02; F02B 33/00; F02D 15/00; F02D 15/04; F02D 41/0007; F02D 2041/001; F02D 2200/0406; F02D 2200/101; F02D 29/06; F02D 13/0253; F02D 13/0223
USPC .......................................................... 60/602
See application file for complete search history.

(56) References Cited

U.S. PATENT DOCUMENTS

| | | | | |
|---|---|---|---|---|
| 5,064,423 A | * | 11/1991 | Lorenz | F02D 23/02 60/611 |
| 6,568,186 B2 | * | 5/2003 | Zaleski | F01B 17/02 60/39.6 |
| 2007/0245982 A1 | * | 10/2007 | Sturman | F02B 21/00 123/26 |

(Continued)

*Primary Examiner* — J. Todd Newton
(74) *Attorney, Agent, or Firm* — Lee & Hayes, P.C.

(57) ABSTRACT

Passage-separated intake of the present invention refers to that a separate supercharged intake passage and a separate supercharged intake supply apparatus are provided such that natural intake is separated from supercharged intake to implement respective intake without mutual interference. Time-separated intake refers to that in order to avoid a cylinder C from becoming a passage between natural intake and supercharged intake, natural intake is performed first in an intake stroke, and supercharged intake is performed after a bottom dead center of the intake stroke at the end of the natural intake.

10 Claims, 1 Drawing Sheet

(56) References Cited

U.S. PATENT DOCUMENTS

| | | | | |
|---|---|---|---|---|
| 2008/0006251 | A1* | 1/2008 | Schmid | F02M 26/37 123/568.21 |
| 2008/0072595 | A1* | 3/2008 | Nemeth | F02D 9/1035 60/605.1 |
| 2009/0183699 | A1* | 7/2009 | Sturman | F02B 33/44 123/63 |
| 2010/0031934 | A1* | 2/2010 | Tayyari | F02B 33/44 123/559.1 |
| 2010/0095914 | A1* | 4/2010 | Evans-Beauchamp | F02B 33/44 123/68 |
| 2010/0192878 | A1* | 8/2010 | Mustafa | B60K 6/12 123/2 |
| 2010/0258067 | A1* | 10/2010 | Hu | F02B 33/22 123/58.1 |
| 2011/0041496 | A1* | 2/2011 | Mayr | F02B 21/00 60/611 |
| 2012/0186249 | A1* | 7/2012 | Guzzella | F02B 37/04 60/612 |
| 2012/0240909 | A1* | 9/2012 | Geyer | F02B 29/00 123/559.1 |
| 2015/0136071 | A1* | 5/2015 | Dortch, Jr. | F02B 33/44 123/294 |
| 2017/0370277 | A1* | 12/2017 | Bunjes | F02B 21/00 |

* cited by examiner

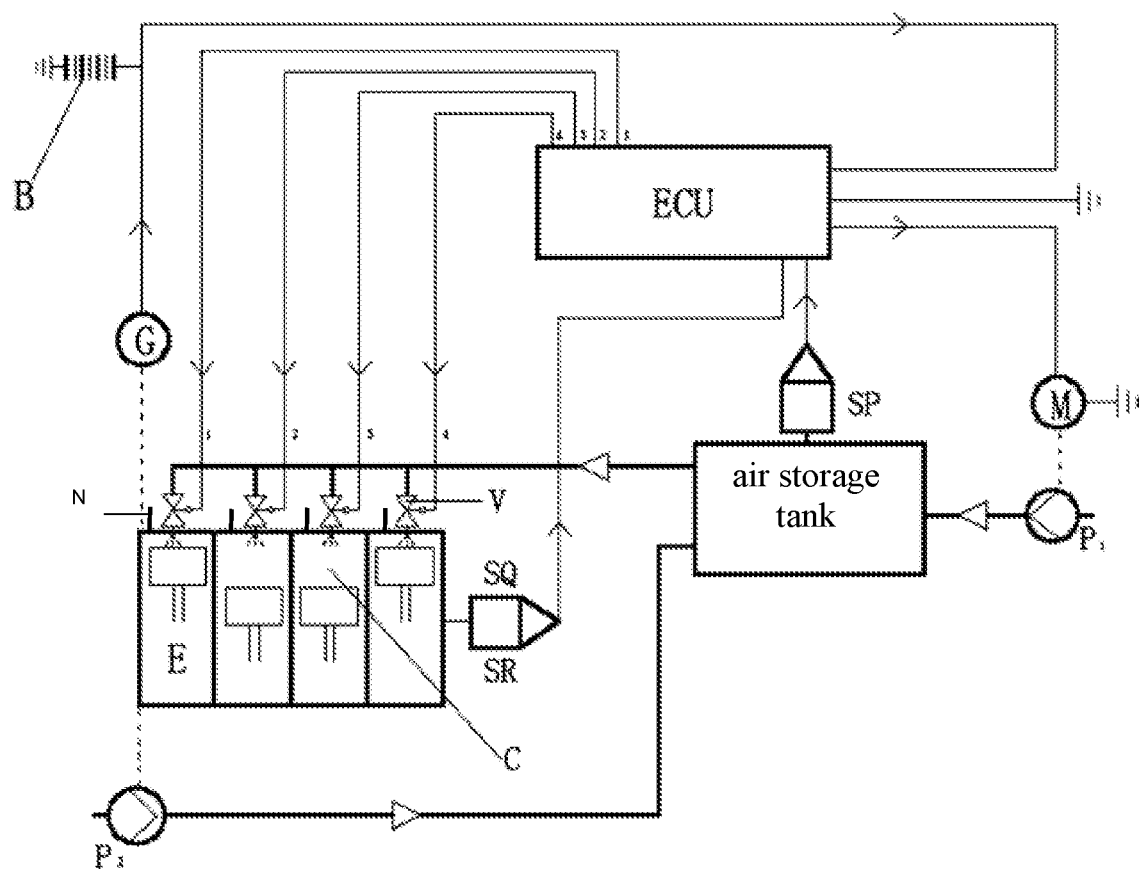

FULL WORKING CONDITION PASSAGE-SEPARATED AND TIME-SEPARATED SUPERCHARGED INTAKE INTERNAL COMBUSTION ENGINE VARIABLE COMPRESSION RATIO TECHNOLOGY

This application is a U.S. national stage application under 35 USC § 371 of International Application No. PCT/CN2018/082900 filed on Apr. 13, 2018 and entitled "FULL WORKING CONDITION PASSAGE-SEPARATED AND TIME-SEPARATED SUPERCHARGED INTAKE INTERNAL COMBUSTION ENGINE VARIABLE COMPRESSION RATIO TECHNOLOGY," the entire contents of which are incorporated herein by reference.

TECHNICAL FIELD

The present invention relates to the field of intake and exhaust technologies of a four-stroke reciprocating piston internal combustion engine, and in particular, to an ECU-controlled supercharged intake variable compression ratio technology.

BACKGROUND

Internal combustion engines have been invented for more than 100 years. During the development of the internal combustion engines, most of the researches are focused on intake and exhaust technologies of the internal combustion engines. For example, the internal combustion engines have undergone development from a single intake/exhaust valve to multiple valves, from a fixed lift to a variable lift, and from natural intake to supercharged intake. The thermal efficiency of the internal combustion engines has been raised from 15% initially to 30% for gasoline engines and 40% for diesel engines (which refer to massively produced internal combustion engines) currently. The raising of the thermal efficiency mainly depends on progress in the intake and exhaust technologies of the internal combustion engines. The intake and exhaust technologies all aim at increase in an intake amount and complete discharge. The internal combustion engines work by expansion of heated gas, and a greater intake amount results in a higher power. However, the intake and exhaust technologies of existing four-stroke reciprocating piston internal combustion engines (briefly referred to as internal combustion engines below) have many shortcomings, which are mainly as follows. 1. An intake amount is insufficient. The existing internal combustion engines all use an intake delay technique without exception, in which case the space for a compression stroke is occupied and a delayed intake amount equals a reduced intake volume, resulting in an "invalid intake volume." At present, an internationally applied calculation of a volume of the internal combustion engine is: the circle area of a cylinder×a stroke length of a piston=a stroke volume. The invalid intake volume is calculated as: an intake delay angle of a crankshaft/a stroke angle of the crankshaft. For example, it is assumed that an internal combustion engine has a volume of 3.0 L, and its intake delay angle is 60 degrees. After substitution into the foregoing formula, 60 degrees/180 degrees=$1/3$, and 3.0 L×$1/3$=1.0 L. Thus, it is obtained that, this 3.0 L internal combustion engine has an invalid intake volume of 1.0 L. Further, according to the formula: stroke volume−invalid intake volume=actual intake volume, namely, 3.0 L−1.0 L=2.0 L, it is obtained that, this 3.0 L internal combustion engine has a theoretical intake volume of 2.0 L. Considering a gas pressure, temperature, and other factors, an actual intake amount is less than 1.8 L. The insufficient intake amount is due to an excessively slow intake speed. A downward mechanical movement speed of the piston during intake of the internal combustion engine is greater than an intake airflow speed. A reason for such a phenomenon is that a sectional area of an intake passage is less than a circle area of a cylinder, and this phenomenon can be avoided if the sectional area of the intake passage is equal to or greater than the circle area of the cylinder. However, the internal combustion engine is always designed in such a manner which has not been changed so far. The invalid intake volume still exists, failing to achieve full-volume intake. The insufficient intake amount mainly brings the following adverse effects: (1) a large size but small power; (2) a large friction loss; and (3) low thermal efficiency. 2. The existing supercharged intake technology cannot realize full working condition supercharging, and there is a dead zone in supercharging. Specifically, driven by the internal combustion engine, an existing supercharged intake device cannot implement supercharged intake when the internal combustion engine is in great need of supercharged intake at a low rotational speed, but has the highest supercharged intake capability when the internal combustion engine does not require supercharged intake at a high rotational speed. Such a supercharged intake technology goes against the properties of the internal combustion engine, and cannot meet the intake demand of the internal combustion engine. Because the supercharged intake and natural intake share the same intake passage, all exiting shortcomings of the internal combustion engine using supercharged intake cannot be overcome. 3. Exhaust gas after combustion cannot be thoroughly discharged. The internal combustion engine has a combustion chamber, and the exhaust gas after combustion is forcibly discharged upward from the cylinder by means of the piston. Because the piston cannot be moved to the combustion chamber, the exhaust gas in the combustion chamber cannot be thoroughly discharged. At the end of gas exhaust, the pressure inside the combustion chamber generally ranges from 1.03 bar to 1.23 bar, and the pressure inside an intake pipe generally ranges from 0.74 bar to 0.88 bar. An intake passage and an exhaust passage are interconnected where the intake valves overlap with the exhaust valves. In this case, a high-pressure airflow inevitably moves towards a low-pressure zone, and such a movement causes backflow in a direction from an exhaust pipe to the intake pipe, resulting in reduced intake efficiency. After completion of the exhaust stroke, the exhaust gas in the combustion chamber has a temperature of 773k to 1073k, while an intake temperature is merely 353k to 403k, with a temperature difference of 320K to 670k. Heat is similar to pressure in movement, and a high-temperature airflow moves towards a low-temperature zone. This heat transfer reduces an intake density and decreases an intake amount by about 15% (by mass). The exhaust gas after combustion contains no oxygen and cannot be used to support combustion.

A variable compression ratio technology is that the internal combustion engine can work at the highest compression ratio and limited knocking in any working condition, thus achieving the highest thermal efficiency. This is the ideal working state of the internal combustion engine. As the internal combustion engine may work at different rotational speeds, different loads, different elevations, and different temperatures, the variable compression ratio is a technology most applicable to these working environments, which is the consensus in the industry for more than 100 years since the advent of the internal combustion engines. Such a consensus was formed more than 60 years ago and has not changed so far.

The currently produced prototypes with a variable compression ratio all resort to changing the volume of the combustion chamber and changing the volume of the cylinder, which both need to change the structure of the internal combustion engine. Changing the structure mainly brings the following problems: (1) complicating the structure due to addition of components and parts; (2) a high failure ratio and short service life; (3) an increase in mass and a resultant increase in friction loss; (4) high costs; and (5) failing to reach a corresponding control level and to accurately change a compression ratio at a proper time.

SUMMARY OF THE INVENTION

In view of the shortcomings in the existing variable compression ratio technology of an internal combustion engine, the present invention provides a full working condition supercharged intake technology so as to change an intake amount and achieve a variable compression ratio of an internal combustion engine, without changing the structure of the internal combustion engine.

Theoretically, there are three ways to change a compression ratio: 1. changing the volume of a combustion chamber; 2. changing the volume of a cylinder; and 3. changing an intake amount. The present invention adopts the way of changing the intake amount. The reason is that only this way does not require changing the current structure of massively produced internal combustion engines. In addition, the intake amount is sufficient by use of the technical solution of the present invention.

The technical solution of the present invention is:

A full working condition passage-separated and time-separated supercharged intake variable compression ratio technology.

I. Setting the Volume of a Combustion Chamber According to the Lowest Compression Ratio.

In the present invention, the volume of a combustion chamber is set according to the lowest compression ratio. Because the volume of a combustion chamber of an existing internal combustion engine is set according to a middle value, under such setting, a variable compression ratio is achieved only between the middle compression ratio and the highest compression ratio, not between the middle value and the lowest value. A full working condition variable compression ratio can be achieved only when the supercharged intake variable compression ratio technology sets the volume of the combustion chamber according to the lowest compression ratio. For example, it is assumed that the highest designed rotational speed of a diesel engine is 3500/rpm with a compression ratio of 7:1, and the lowest rotational speed is 650/rpm with a compression ratio of 21:1. Then, a variable compression ratio of this diesel engine ranges from 21:1 to 7:1, with a middle value of 14:1, and the compression ratio of the current internal combustion engine is set to 14:1. If the volume of the combustion chamber is set according to this middle value, the variable compression ratio can only be achieved within a range from 21:1 to 14:1. That is to say, the variable compression ratio is achieved in a speed range from 650/rpm to 2075/rpm, but the compression ratio cannot be changed in a speed range from 2075/rpm to 3500/rpm. Thus, knocking cannot be avoided. Setting the volume of the combustion chamber according to the lowest value aims to avoid knocking in the full working condition, which is a near-perfect design without any compromise.

Such a design brings the following problem. The compression ratio of 7:1 is a value at which diesel oil may be compression-ignited at 3500/rpm. In this case, diesel oil can be ignited at the current temperature of compressed air, and is unlikely to burn ahead of time, thus avoiding knocking. However, diesel oil cannot be compression-ignited below 3500/rpm at the compression ratio of 7:1, and startup of the internal combustion engine becomes a problem, which poses a challenge to an intake technology. Thus, startup of the internal combustion engine requires that a cylinder pressure equal to that at the compression ratio of around 14:1 is reached in the working condition of zero, namely, at the time of startup. For a solution to the startup problem, reference is made to the following second item.

II. Designing a Supercharged Intake Supply Apparatus.

The aim lies in supercharged intake in all of idle-, middle-, and high-speed zones without constraint to the rotational speed of the internal combustion engine. This supercharged intake supply apparatus is mainly composed of an electric motor, an air compressor, and an air storage tank. In the present invention, the electric motor is used to drive the air compressor, so that the requirement of supercharged intake by the internal combustion engine in various working conditions is met. The existing supercharged intake technology is generally driven by the internal combustion engine itself. Both before and after startup, an intake pressure of startup cannot be achieved in most zones. The use of the air storage tank for air storage has the following advantages: 1. Supercharged intake can be performed at any time. 2. Loss in storage and release is small, which is negligible compared to losses in electric and thermal storage and release. 3. The pressure is high and stable, and an air supply amount is sufficient. The air compressor first delivers air to the air storage tank for storage, and then boosts the pressure. The air storage tank is fitted with a pressure sensor which transmits pressure signal data to a numerical control apparatus ECU of the internal combustion engine. A pressure value which satisfies supercharged intake of the internal combustion engine is set in the ECU. According to this value, the ECU sends, with reference to the pressure signal data from the air storage tank, a working, stopping, or rotational speed instruction to the electric motor that drives the air compressor. Such a supercharged intake supply apparatus can realize full working condition supercharged intake without a dead zone in supercharging.

III. Using a Passage-Separated and Time-Separated Intake Technology.

This technology is the core of the present invention. The passage-separated intake technology is that supercharged intake is separated from a natural air intake passage, and is operated by means of its own separate air passage. Air is directly passed from the air storage tank to a combustion chamber of each cylinder via an electromagnetic gas valve. This technology is similar to direct diesel and gasoline injection technology in the existing internal combustion engine, and the difference is that air, instead of fuel, is injected. Thus, an air intake passage, or referred to as an electronic air injection passage, is added. A time-separated intake technology refers to that electronic air injection is separated from natural intake in time, and both are not performed at the same time. Natural intake is carried out in an intake stroke, while electronic air injection is carried out in a compression stroke. The cylinder is in communication with the atmosphere during the intake stroke and is in an open state. The cylinder is not in communication with the atmosphere during the compression stroke and is in a closed state. The air imported through the electronic air injection passage enters the cylinder when it is in a closed state. That is to say, the electronic air injection passage achieves 100% of time-separated intake efficiency, which is a unique feature of the present invention. Such a high intake efficiency lays a sound foundation for application of a computer numerical control technology and an artificial intelligence technology, thus realizing accurate intake control at a proper time required by the variable compression ratio of the internal combustion engine. In this case, it is only required to input data about an intake amount at compression ratios corresponding to different rotational speeds of different speed zones of the internal combustion engine to the ECU of the internal combustion engine. Then, the ECU sends a corresponding intake instruction to an electronically-controlled intake valve according to signal data from a crankshaft position sensor and a crankshaft speed sensor of the internal combustion engine, and the electronically-controlled intake valve injects a corresponding amount of air into the cylinder according to the instruction. In this case, the variable compression ratio technology by means of supercharged intake is basically implemented. Air distribution phases needs to be further adjusted and improved.

IV. Adjusting Air Distribution Phases.

An angle in an intake phase is changed to 180 degrees identical with that in an intake stroke, with no advance or delay. An angle in a compression phase is also changed to 180 degrees identical with that in a compression stroke. Because air intake through the electronic air injection passage is performed in the compression stroke, an intake delay technology for natural intake is already replaced with the high-efficiency electronic air injection technology. The amount of air imported by the intake delay technology greatly differs from the amount of air imported by the passage-separated and time-separated electronic air injection technology, and is almost negligible. At the beginning of the compression stroke, the pressure in the cylinder is less than 1 bar and is a negative pressure, while the pressure in the electronic air injection passage can easily reach 8 bar to 10 bar. In this way, full-working condition, full-volume and super-volume supercharged intake can be implemented. An exhaust phase does not require setting of a delay angle, and is ended at a top dead center. A start angle remains unchanged.

V. Using Intake and Forcible Exhaust Technology in an Exhaust Stroke.

The electronic air injection passage in the passage-separated intake technology directly goes into the combustion chamber, and can be used to intake air in an exhaust stroke. An intake position before the top dead center of the exhaust stroke is set, and an intake amount slightly greater than the volume of the combustion chamber is further set. Data about the intake position and the intake amount is input to the ECU of the internal combustion engine. The ECU sends an intake signal to the electronically-controlled intake valve according to a signal from the crankshaft position sensor. The intake valve starts intake according to the instruction, and exhaust gas is discharged from the combustion chamber of the internal combustion engine.

The present invention has the following remarkable effects:

1. High intake efficiency and high thermal efficiency are achieved. The supercharged intake technology of the present invention conforms to the intake characteristics of the internal combustion engine. The present invention eliminates a dead zone in supercharging in the existing supercharged intake technology, implements full working condition supercharged intake, and further enables full-volume and super-volume intake, thus achieving a variable compression ratio by supercharged intake. A basic principle of the internal combustion engine is that an intake amount is in direct proportion to the thermal efficiency.

2. A high intake control precision is achieved. The present invention uses ECU-based intake technology with artificial intelligence and numerical control, which can accurately change the compression ratio at a proper time.

3. The exhaust gas in the combustion chamber can be thoroughly discharged. The intake and forcible exhaust technology in an exhaust stroke of the present invention solves the long-term problem that the exhaust gas in the combustion chamber cannot be thoroughly discharged since the advent of the internal combustion engine, achieving no backpressure and backflow in the natural air intake passage.

4. The problem that the internal combustion engine at a high elevation has reduced power and is not easily started is solved. The supercharged intake technology of the present invention uses an electric motor to drive an air compressor and an air storage tank to store air, so that the internal combustion engine at a high elevation can be supplied with sufficient air. Thus, the elevation can no longer affect the performance of the internal combustion engine.

5. The key technical problem of compression ignition of the internal combustion engine is addressed. The present invention sets the volume of the combustion chamber according to the lowest compression ratio, thus solving the knocking problem of the internal combustion engine, including a gasoline engine.

6. The structure is simple. The present invention relates to a variable compression ratio technology by changing an intake amount, and has the same structure as the existing internal combustion engine. Therefore, the present invention is unlikely to encounter the problems caused by a structural change in the existing variable compression ratio internal combustion engines (prototypes).

BRIEF DESCRIPTION OF THE DRAWINGS

FIG. 1 is a schematic structural diagram of the present invention.

As shown in FIG. 1, two air compressors $P_1$ and $P_2$ are provided, M represents an electric motor, SP represents a pressure sensor, SQ represents a crankshaft position sensor, SR represents a crankshaft speed sensor, ECU represents a numerical control apparatus, G represents a generator, V represents an electromagnetic gas valve, B represents a battery, and C represents a cylinder.

The generator G supplies power to the battery B. After receiving a signal from the pressure sensor SP of the air storage tank, the ECU controls a working condition of the electric motor M. The electric motor M is connected to the air compressor $P_1$ and the battery B is used for circuit power supply. The air compressor $P_1$ pumps compressed air into the air storage tank, and then the air storage tank delivers the air to the electromagnetic gas valve V. Data about an intake amount at compression ratios corresponding to different rotational speeds of different speed zones of the internal combustion engine is input to the ECU of the internal combustion engine. The ECU sends a corresponding intake instruction to the electromagnetic gas valve V according to signal data from the crankshaft position sensor SQ and the crankshaft speed sensor SR of the internal combustion engine, and the electromagnetic gas valve V injects a corresponding amount of air into the cylinder C according to the instruction. The air compressor $P_2$ is driven by the internal combustion engine, and a small-size internal combustion engine does not have the air compressor P$_2$.

DETAILED DESCRIPTION

A full working condition passage-separated and time-separated supercharged intake internal combustion engine variable compression ratio technology, wherein a supercharged intake supply apparatus is provided to perform supercharged intake in a passage-separated and time-separated manner, so as to change a supercharged intake amount to change a compression ratio. The passage-separated intake is that the supercharged intake is separated from a natural air intake passage N, is operated by means of its own separate air passage, without passing through an intake pipe and an intake valve, and directly enters a cylinder. The time-separated intake is operated by supercharged intake in a sealed environment during a compression stroke, not during an intake stroke. The supercharged intake supply apparatus comprises an electric motor M, an air compressor P1, and an air storage tank, wherein the air compressor is driven by the electric motor to supply an air source, and the air is stored in the air storage tank, achieving sufficient air supply and stable pressure. The supercharged intake amount refers to that an ECU numerical control apparatus controls, according to the requirements of the internal combustion engine, an electromagnetic gas valve V to inject air into a cylinder C, thereby achieving an accurate intake amount at a proper time. The volume of a combustion chamber is set according to the lowest compression ratio at the highest rotational speed of the internal combustion engine, solving the problem of knocking of a diesel internal combustion engine and a gasoline internal combustion engine. At the end of an exhaust stroke, intake is performed to forcibly discharge exhaust gas in a combustion chamber.

What is claimed:

1. A system comprising:
an internal combustion engine configured to provide a variable compression ratio comprising:
a passage-separated and time-separated supercharged intake coupled to a cylinder of the internal combustion engine, the passage-separated and time-separated supercharged intake including a supercharged intake supply apparatus and a supercharged intake passage, the passage-separated and time-separated supercharged intake being separate from a natural intake that is separately coupled to the cylinder; and
wherein:
the supercharged intake supply apparatus comprises an electric motor, an air compressor, and an air storage tank; and
the supercharged intake passage comprises an air passage between the air storage tank and an electromagnetic gas valve.

2. The system according to claim 1, wherein:
a pressure value is set in an ECU to maintain a supercharged intake pressure of the electromagnetic gas valve in a compression stroke;
the ECU controls are configured according to a signal received from a pressure sensor of the air storage tank;
the electric motor is configured to drive the air compressor; and
the air compressor is configured to pump air into the air storage tank and the supercharged intake passage, such that the air storage tank and the supercharged intake passage have a shared constant state pressure at the pressure value set in the ECU.

3. The system according to claim 1, wherein supercharged air intake via the passage-separated and time-separated supercharged intake includes an angle associated with natural air intake via the natural intake adjusted to 180° without setting an advancing angle and a delay angle, and wherein the natural air intake via the natural intake is completed prior to supercharged air intake via the passage-separated and time-separated supercharged intake.

4. The system according to claim 1, wherein:
the supercharged air intake via the passage-separated and time-separated supercharged intake is performed from a bottom dead center of an intake stroke, the bottom dead center of the intake stroke being an intake start position set in an ECU for the electromagnetic gas valve;
controls of the ECU are configured according to a signal received from a crankshaft position sensor;
the electromagnetic gas valve is configured to start the supercharged air intake at the bottom dead center of the intake stroke;
the electromagnetic gas valve in a cylinder performs the supercharged air intake; and
one or more natural intake valves and one or more exhaust valves are both closed during the supercharged air intake.

5. The system according to claim 1, wherein:
data related to a supercharged intake amount associated with the supercharged air intake is input to the ECU, values of the supercharged intake amount being different at different rotational speeds of the internal combustion engine; and
the ECU, configured according to a signal received from a crankshaft speed sensor and the data related to the supercharged intake amount, is configured to control the electromagnetic gas valve to inject air into the cylinder, an amount of air injected into the cylinder being determined based on the signal received from the crankshaft speed sensor and the data related to the supercharged intake amount, the compression ratio of the internal combustion engine varying based on the supercharged intake amount.

6. The system according to claim 1, wherein:
a supercharged intake start position is set in the ECU, the supercharged intake start position being close to a top dead center of an exhaust stroke and the ECU is configured to control, according to a signal received from the crankshaft position sensor, the electromagnetic gas valve to start supercharged air intake via the supercharged intake before the top dead center of the exhaust stroke;
a supercharged intake amount greater than or equal to the volume of a combustion chamber is set in the ECU for the exhaust stroke; and
a supercharged intake end position is set in the ECU, the supercharged intake end position being at the top dead center of the exhaust stroke, and the ECU is configured to control, according to a signal received from the crankshaft position sensor, the electromagnetic gas valve to complete the supercharged air intake at the top dead center of the exhaust stroke.

7. The system according to claim 1, wherein the cylinder is in communication with the atmosphere via the natural intake during natural air intake via the natural intake.

8. The system according to claim 1, wherein the electromagnetic gas valve is coupled directly to the cylinder.

9. The system according to claim 1, wherein a supercharged intake path from the air storage tank into the cylinder is separate from a natural intake path from the atmosphere into the cylinder.

10. The system according to claim 9, wherein the internal combustion engine is configured to:
 close the supercharged intake path during natural air intake via the natural intake; and
 close the natural intake during supercharged air intake via the supercharged intake path.

* * * * *